United States Patent Office 3,562,231
Patented Feb. 9, 1971

---

3,562,231
BROMINATION OF PROPARGYL METHACRYLATE POLYMERS AND PRODUCTS PRODUCED THEREBY
Gaetano F. D'Alelio, South Bend, Ind., assignor to Geigy Chemical Corporation, Ardsley, N.Y., a corporation of New York
No Drawing. Filed June 28, 1968, Ser. No. 740,862
Int. Cl. C08f *15/18*
U.S. Cl. 260—85.5
9 Claims

ABSTRACT OF THE DISCLOSURE

The process disclosed herein is the bromination of polymers of propargyl methacrylate and the brominated products produced thereby. Propargyl methacrylate has a terminal acetylenic group which upon bromination gives an ethylenic dibromo derivative which is hydrolytically stable. In comparison the derivative obtained upon dibromination of a polymer of allyl methacrylate gives dibromopropyl methacrylate repeating units whereas the dibromonation of propargyl methacrylate gives dibromoallyl methacrylate repeating units. In view of the ethylenic group in the dibromoallyl radical, the bromine atoms are very resistant to hydrolysis whereas the bromine in the dibromopropyl radical is much more susceptible to hydrolysis. Moreover, the bromination of a terminal acetylenic group proceeds with much greater facility and more thoroughly under milder conditions than is the case when the acetylenic group is a non-terminal acetylenic such as 2-butyn-1-yl acrylate or methacrylate.

BACKGROUND OF THE INVENTION

Field of the invention

This invention relates to the bromination of propargyl methacrylate polymers. More specifically, it relates to the process of brominating acetylenic methacrylate repeating units having a terminal acetylenic group and the products produced thereby. Still more specifically, it relates to bromination capable of producing dibromo derivatives which still have ethylenic unsaturation effective for stabilizing the derivatives against hydrolysis.

Related prior art

Bromination of non-terminal acetylenic acrylates are disclosed in a doctorate thesis submitted in 1965 by Robert C. Evers to the graduate school of the University of Notre Dame. However, these brominations are produced by long exposure to bromine, the bromination of 2-butynyl methacrylate and the corresponding acrylate being effected over a period of 1 week at 0° C. Bromination effected over a period of 1 month at 20° C. on a linear polymer of 2-butyn-1-yl acrylate gives a substantial amount of tetrabromination. However, these long periods of bromination are impractical.

STATEMENT OF THE INVENTION

In accordance with the present invention, it has now been found that bromination can be more easily, more quickly and more completely effected on propargyl methacrylate which has a terminal acetylenic group than on acetylenic acrylates having non-terminal acetylene groups. Moreover, the brominating conditions, particularly concentration of bromine solution and time required for the desired degree of bromination can be much more mild with propargyl methacrylate because of its terminal acetylenic group. Either ethylenic dibromo derivatives or tetrabromo derivatives can be produced.

For the bromination purposes of this invention, polymers of propargyl methacrylate are preferred rather than the corresponding acrylate since this methacrylate monomer is more easily prepared and is more stable than propargyl acrylate. In order to avoid or minimize the amount of crosslinking effected during the polymerization of the propargyl methacrylate, polymerization is effected by anionic initiators, such as sodium naphthalene.

The homopolymers and copolymers suitable for bromination in accordance with this invention has a plurality of repeating units therein derived from propargyl methacrylate having the structure

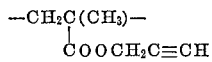

The copolymers also have repeating units of the comonomers as described hereinafter.

The bromination of the propargyl methacrylate repeating units can be represented as follows:

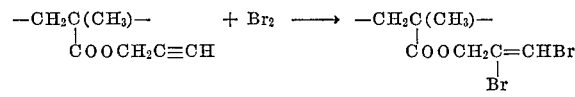

(Formula A)

When the polymer or copolymer has substantially all the acetylenic groups dibrominated, further bromination can be effected under appropriate conditions of bromine concentration, temperature, etc. as follows:

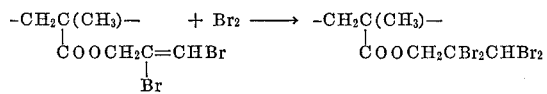

(Formula B)

The brominated polymers and copolymers of this invention are particularly useful as fire retardant materials. Because of the hydrolytic stability of the ethylenic dibromide, these materials can be stored or used for substantial periods without loss of fire retarding power which might otherwise be of concern upon exposure to moisture. By varying the proportions of propargyl methacrylate and respective other comonomers, the other properties in the ultimate copolymer can be governed according to the type and proportion of comonomer. The appropriate proportion of propargyl methacrylate can be incorporated to impart the desired amount of fire retardant properties by complete or substantially complete dibromination of all the repeating units in the copolymer.

In attempting to polymerize the propargyl methacrylate, the use of free radical-generating activators, such as peroxy compounds, azo compounds, etc. generally results in a substantial degree of polymerization in the acetylenic unsaturation as well as in the ethylenic unsaturation with resultant crosslinking and a high degree of gellation. While a small amount of gellation is permissible, in which case the gel can be separated and the remaining ungelled polymer can be used, it is undesirable to have a high proportion of gelled polymer since it is difficult to postreact a polymer in this form. Therefore, the polymers of propargyl methacrylate for use in this invention are advantageously prepared by anionic activators which help to make more selective polymerization in the ethylenic unsaturation. Also as pointed out above, the presence of the methyl group in the methacrylate radical likewise helps.

Methods disclosed in the literature for conducting anionic polymerizations are suitable for preparing the homopolymers and copolymers used in this invention. Both block and random copolymers may be employed in this invention. Suitable anionic polymerization systems and methods for preparing homopolymers and block and random copolymers are described in D'Alelio U.S. Pats. Nos. 3,203,915 and 3,309,423. Typical anionic activators are also disclosed therein.

For example the anionic polymerization can be initiated by alkali metal hydrides such as NaH, LiH, KH, CsH, including various complexes thereof, such as LiAlH$_4$, etc., alkali metal hydrocarbons, such as the metal alkyls of Li, Na, K and Cs with the hydrocarbon group being methyl, ethyl, propyl, isopropyl, butyl, amyl, isoamyl, benzyl, triphenylmethyl, phenyl, naphthyl, octyl, etc., preferably containing no more than 12 carbon atoms in a hydrocarbon group.

Also suitable are Grignard reagents having the formula R″MgX, where R″ is a hydrocarbon group as listed above and X is halogen. Typical examples of these are phenyl magnesium bromide, butyl magnesium bromide and chloride, vinyl magnesium bromide, allyl magnesium bromide, etc.

The free alkali metals such as lithium, sodium and potassium can also be used as activators, including combinations of alkali metals and aromatic compounds such as naphthalene, anthracene, methylstyrene tetramer, styrene, etc. and liquid ammonia solutions of the alkali metals. Also useful are ketyls which are the reaction products alkali or alkaline earth metals with ketones, such as benzophenone in ether, for example the sodium reaction product of benzophenone, etc.

Solvents or diluents may be used, if desired, and these can be selected from the class of aliphatic and aromatic hydrocarbons, ketones, ethers, and esters, such as butane, propane, hexane, cycloheptane, octane, benzene, toluene, xylene, dimethyl ether, diethyl ether, dibutyl ether, tetrahydrofurane, dioxane, diphenyl ether, dibenzyl ether, dimethyl ethylene glycol ether, dibutyl ethylene glycol ether, diethyl diethylene glycol ether, etc.

The anionic polymerization can be carried out at temperatures ranging from −80° C. to about 80° C. Although the range of −40° C. to 60° C. is advantageous, it is generally more practical to operate in the range of −20° C. to 40° C.

The anionic polymerizations produce linear polymers having a plurality of repeating units of the formula

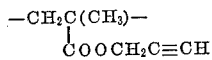

When comonomers are used with the propargyl methacrylate, repeating units derived from such other monomers are also present in the linear copolymers. There are at least one and preferably at least two propargyl methacrylate repeating units per copolymer molecule.

The polymers and copolymers used in this invention advantageously have a molecular weight of at least 500 and preferably at least 5000. There is no upper limit since this is generally determined by practical considerations. However, there is generally no particular advantage in exceeding molecular weights of about 800,000. The copolymers advantageously contain at least one percent by weight of propargyl methacrylate in the polymer molecules.

Preferred comonomers for use in preparing the propargyl methacrylate copolymers used in this invention are the vinyl and vinylidene comonomers represented by the formula

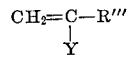

and the repeating units derived from such comonomers are represented by the formula

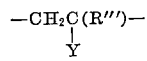

In these formulas, R″ represents hydrogen or the methyl, or cyano radical, preferably hydrogen or methyl; Y represents:

(a) hydrocarbon, including alkyl, aryl, alkaryl, aralkyl, cycloalkyl, alkylcycloalkyl, cycloalkyl-alkyl;
(b) cyano; and
(c) —COOR″, wherein R″ is as defined herein.

The hydrocarbon groups of R′ and R″ preferably have 1–8 carbon atoms. Typical repeating units for such comonomers are those of methyl acrylate, styrene and acrylonitrile which are

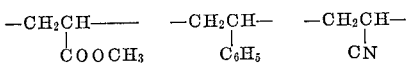

Typical examples of the comonomers of the above formulas that can be used in preparing the copolymers of this invention include the following: styrene, α-methylstyrene, vinyl toluene, vinyl xylene, isopropenyl toluene, vinyl naphthalene, isopropenyl naphthalene, vinyl diphenyl, isopropenyldiphenyl, ethylene, propylene, butene-1, 2-methyl-butene-1, hexene-1, 2-methyl-hexene-1, decene-1, 3-phenyl-propene-1, 4-phenylbutene-1, 2-methyl-3-phenylbutene-1, vinyl cyclohexane, vinyl cycloheptane, vinyl methylcyclohexane, vinyl methylcycloheptane, 3-vinyl methylcyclohexane, vinyl methylcycloheptane, 3-cyclohexylbutene-1, 2-methyl-3-cycloheptyl-butene-1, 4-cyclopentyl-pentene-1, acrylonitrile, methacrylonitrile, vinylidene cyanide, methyl a-cyanoacrylate, methyl methacrylate, methyl acrylate, ethyl acrylate, propyl methacrylate, phenyl acrylate, phenyl methacrylate, benzyl acrylate, naphthyl acrylate, cyclohexyl acrylate, cyclohexyl methacrylate, etc.

In conducting the bromination of the propargyl methacrylate polymers according to this invention, the proportion of bromine used is at least 5 parts per 100 parts of polymer. The selected amount of bromine is dependent somewhat on whether all of the acetylenic groups present are to be dibrominated or to be tetrabrominated. However, the minimum amount of bromine recited above is based on the minimum amount of bromine that needs to be added to the polymer in order to effect a desired change in properties with respect to fire retardance or other desired properties. If the bromination is to be taken to a complete state of dibromination, that is where all of the acetylenic groups are to be dibrominated, then a slight excess of the stoichiometric amount for this purpose is used. When more than this slight excess of the stoichiometric amount but less than the amount theoretically required for tetrabromination is used, the bromination can result in some dibromoethylenic groups and some tetrabrominated groups. When more than the theoretical amount is added for tetrabromination, the completeness of tetrabromination depends somewhat on the temperature and time of reaction. Where the time is sufficient for the particular temperature being used, and there is sufficient bromine for this purpose, tetrabromination can be substantially completed.

The temperature for both dibromination and tetrabromination can be in the range of 0° to 50° C., preferably 20° to 25° C. The time to effect the minimum desired amount of bromination will vary according to the temperature. For example, at a temperature of 50° C. the bromination to the minimum amount will require much less time than to effect the minimum amount of bromination at 0° C. Therefore the minimum time will vary according to the particular temperature being used, although the time is advantageously at least 60 minutes in any case, and preferably at least 180 minutes depending on the temperature and extent of bromination desired.

The bromination is advantageously effected on a solution of the polymer since the starting polymers are solid or very viscous, and become even more so upon bromination. Obviously the solvent should be inert to the bromination. Typical suitable solvents are chlorinated aliphatic and aromatic hydrocarbons, carbon tetrachloride, ethylene dichloride, trichloroethane, chloroform, chlorobenzene, etc., as well as various hydrocarbon solvents inert in bromine under the conditions of these reactions, such as hexane, heptane, octane, benzene, toluene, xylene, etc. The inertness of the solvent is not critical in the sense that it will interfere with the reaction, but it is more desirable in order to avoid waste of the bromine reagent, and also to avoid formation of any bromine derivatives that might precipitate or become viscous and thereby precipitate the polymer.

Typical hydrocarbon monovalent radicals as represented by R', R", and R'" include: methyl, ethyl, propyl, butyl, amyl, hexyl, heptyl, octyl, decyl, phenyl, tolyl, xylyl, naphthyl, methylnapthyl, ethylnapthyl, diphenyl, methyldiphenyl, benzyl, phenethyl, phenylpropyl, cyclohexyl, cyclohexylmethyl, cycloheptyl, methylcycloheptyl. While the hydrocarbon groups listed above do not contain ethylenic unsaturation, groups containing unsaturation can be used provided that the unsaturation does not cause premature crosslinking of the linear copolymers. However, there is no particular advantage in their use. Generally, it is preferable to use alkyl, aryl, aralkyl, alkaryl, cycloalkyl, alkylcycloalkyl and cycloalkyl-alkyl groups.

The practice of this invention is best illustrated by the following examples. These examples are given merely by way of illustration and are not intended to limit the scope of the invention in any way nor the manner in which the invention can be practiced. Unless specifically indicated otherwise, parts and percentages are given as parts and percentages by weight.

EXAMPLE I

Preparation of propargyl methacrylate monomer

Into a round-bottom 3-necked flask fitted with a Dean-Stark trap, a nitrogen inlet, a reflux condenser and a thermometer are placed 63 parts of propargyl alcohol, 86 parts of glacial methacrylic acid, 4 parts of p-toluene sulfonic acid, 0.2 part of p-tert-butyl catechol (as inhibitor) and 120 parts of dry benzene. The reaction mass is placed under a slight nitrogen pressure and refluxed until 18 parts of water is azeotroped over into the Dean-Stark trap. The reaction mass is then neutralized with a saturated sodium carbonate aqueous solution and dried over anhydrous sodium carbonate. The sodium carbonate is then filtered off and the benzene stripped off under reduced pressure. Distillation of the residue gives a 72% yield of propargyl methacrylate having a boiling point of 73° C. at 66 mm. of Hg.

EXAMPLE II

Anionic polymerization

A 5-necked glass flask is used as the reaction vessel. This is connected with an evacuation means for producing a high-vacuum and fitted with an externally driven magnetic stirrer, one of the side arms of the flask being attached to a 50-ml. round bottomed flask and also fitted with a stop-cock, crowned with a serum cap, and a helium inlet tube. A solution of about 50% propargyl methacrylate monomer (or monomer mixture) in tetrahydrofurane is stored over calcium hydride in the round-bottom flask for at least 8 hours and then degassed twice at $3 \times 10^{-6}$ mm. Hg. The reaction vessel is flamed in a stream of helium and then the monomer and solvent are distilled into the reaction vessel. The system is then pressured with helium to slightly above atmospheric pressure and the reaction vessel then cooled to the desired temperature. In most cases, unless otherwise specified, this temperature is —40° C. Then initiator solution, in most cases sodium naphthalene solution, is injected volumetrically by means of a hypodermic syringe through the serum cap. The initiator to monomer mole ratio is 1:40. The polymerization is allowed to proceed with continued agitation until a noticeable increase in viscosity is observed. The polymerization is terminated by injection of 3 parts of methanol into the solution mixture. The resultant polymer is isolated by precipitation in a non-solvent, redissolved and reprecipitated 3 times in a suitable solvent-nonsolvent system. The polymer solutions are filtered through sintered discs before reprecipitation. Generally, benzene is used as the solvent and heptane as the precipitant. About 0.2% 2,6-di-tert-butyl-p-cresol is used as inhibitor in both solvent and precipitant. The isolated polymer is dried to constant weight in a vacuum at about 25° C. The filtrate is evaporated under reduced pressure to isolate hexane-soluble polymer.

EXAMPLE III

Post-bromination of polymers

Into a glass-stoppered flask there is placed a solution of 0.6 part of a homopolymer of propargyl methacrylate prepared according to Example II and dissolved in 3 parts of carbon tetrachloride. To this is added a slight excess over the theoretical amount of bromine calculated for the desired amount of addition to the acetylenic groups in the polymer. The resulting mixture is well agitated to assure thorough mixing and then the flask is stopped and placed in a bath maintained at 30° C. for three hours. At the end of this time, 15 parts of heptane is added and the precipitated polymer is isolated by filtration and then redissolved and reprecipitated twice, carbon tetrachloride being used as the solvent and heptane as the precipitant. The resulting polymer has repeating units represented by Formulas A and B shown above. When the amount of bromine is not greatly in excess of 1 mole per acetylenic group therein, there are mostly repeating units of Formula A; when a considerable excess over 1 mole of bromine is used per acetylenic group there are also repeating units of Formula B; and when 2 moles or more of bromine are used, there are more repeating units of Formula B than of Formula A.

EXAMPLE IV

The bromination procedure of Example III is repeated twice using in one case the homopolymer of propargyl methacrylate as in Example I, and in the other case a homopolymer of 2-butyn-1-yl acrylate in order to compare the bromination of a terminal acetylenic group and a non-terminal acetylenic group as in the 2-butyn-1-yl group. In the latter case, the acrylate is selected instead of the methacrylate so that the respective repeating units are of equal weight. This simplifies measuring and comparing the extent of relative bromination. Both of the homopolymers are made according to the procedure of Example II and are brominated according to the procedure of Example III using in each case 10% excess over the theoretical amount of bromine required for dibromination and a sample is removed at various intervals for a determination of the extent of bromination. The results are tabulated below and show that the dibromination of the repeating units in the propargyl methacrylate polymer proceeds much more rapidly than the dibromination of the non-terminal acetylenic group in the 2-butyn-1-yl.

TABLE I

| Time, hours: | Homopolymer of propargyl methacrylate percent bromination | Homopolymer of 2-butyn-1-yl acrylate percent bromination |
|---|---|---|
| 0.25 | 25 | 11 |
| 0.50 | 35 | 16 |
| 0.75 | 50 | 21 |
| 1.0 | 60 | 26 |
| 2.0 | 75 | 48 |
| 3.0 | 100 | 65 |

Repeating the above procedure using temperatures of 0° C. and 50° C. illustrates that lowering the temperature has a greater effect in retarding the rate of bromination of the non-terminal acetylenic group and less effect on the terminal acetylenic group, whereas raising the temperature has a greater effect in speeding up the rate of bromination for the terminal acetylenic group and less of a speeding effect with the non-terminal group.

EXAMPLE V

The procedure of Example III is repeated using a higher temperature of 50° C. instead of the one used in Example III and it is found that the dibromination is completed at 1.8 hours instead of the 3 hours used in Example III.

EXAMPLE VI

The dibrominated product from Example IV is further brominated by continuing the bromination at the same temperature after additional bromine has been added in 10% excess over that calculated to effect bromination of the dibromo derivative to the tetrabromo derivative. Tetrabromination is found to be substantially completed at the end of 36 hours.

EXAMPLE VII

Dibromination is effected on a number of copolymers of propargyl methacrylate (PMA) having the respective proportions in the copolymer structures as indicated below:

(a) 75 styrene:25 PMA
(b) 50 vinyl toluene:50 PMA
(c) 80 methyl methacrylate:20 PMA
(d) Acrylonitrile:50 PMA
(e) 75 methyl acrylate:25 PMA
(f) 60 isopropenyl toluene:40 PMA In each case an amount of bromine is used calculated as theoretical plus 10% excess required to dibrominate the number of acetylenic groups present in the copolymer. In each case the dibromination is substantially completed at the end of the reaction period used as in Example III. In addition to the repeating units of Formula A, as given above, the dibrominated copolymers have the respective repeating units as in the starting copolymer. These are namely:

(a) —CH₂CH—
      |
      C₆H₅

(b) —CH₂CH—
      |
      C₆H₄CH₃

(c) —CH₂C(CH₃)—
      |
      COOCH₃

(d) —CH₂CH(CN)—

(e) —CH₂CH—
      |
      COOCH₃

(f) —CH₂C(CH₃)—
      |
      C₆H₄CH₃

Each of these dibrominated copolymers is found to have excellent fire retardant properties, and good shelf life because of the hydrolytic stability effected by the ethylenic group as explained above.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims.

The invention claimed is:

1. A brominated polymer of propargyl methacrylate having a molecular weight of at least 5000 and having a plurality of repeating units therein selected from the class consisting of:

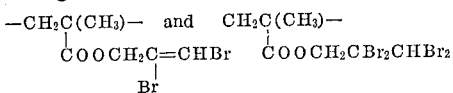

2. A brominated polymer of claim 1 in which said repeating units are predominantly:

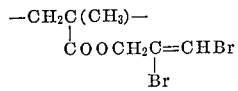

3. A brominated polymer of claim 1 in which said repeating units are predominantly:

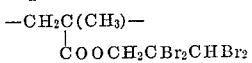

4. A brominated polymer of claim 1 in which said polymer also has repeating units of the structure

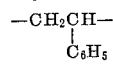

5. A brominated polymer of claim 1 in which said polymer also has repeating units of the structure

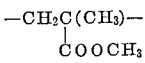

6. A brominated polymer of claim 1 in which said polymer also has repeating units of the structure

—CH₂CH(CN)—

7. A brominated polymer of claim 1 in which said polymer also has repeating units of the structure —CH₂CH(Cl)—

8. A brominated polymer of claim 1 in which said polymer also has repeating units of the structure

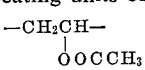

9. A brominated polymer of claim 1 in which said polymer also has repeating units of the structure

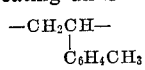

References Cited

UNITED STATES PATENTS

| | | | |
|---|---|---|---|
| 3,183,216 | 5/1965 | Cohen et al. | 260—89.5 |
| 3,254,115 | 5/1966 | Cohen et al. | 260—486 |
| 3,293,226 | 12/1966 | De Schrijver | 260—96Hal |
| 3,437,688 | 4/1969 | Schwartz | 260—486 |

OTHER REFERENCES

Roberts, Basic Principles of Organic Chemistry, published by W. A. Benjamin, Inc., New York, N.Y. (1964), pp. 216.

HARRY WONG, JR., Primary Examiner

U.S. Cl. X.R.

260—33.6, 33.8, 78.5, 86.1, 86.3, 86.7, 89.5, 486, 885, 901